(12) United States Patent
King (10) Patent No.: US 12,297,072 B2
(45) Date of Patent: May 13, 2025

(54) WEB RETRACTOR INCLUDING WEB TAKE-UP PREVENTION APPARATUS

(71) Applicant: INDIANA MILLS & MANUFACTURING, INC., Westfield, IN (US)

(72) Inventor: Jeffrey A. King, Markleville, IN (US)

(73) Assignee: INDIANA MILLS & MANUFACTURING, INC., Westfield, IN (US)

( * ) Notice: Subject to any disclaimer, the term of this patent is extended or adjusted under 35 U.S.C. 154(b) by 703 days.

(21) Appl. No.: 17/635,923

(22) PCT Filed: Aug. 25, 2020

(86) PCT No.: PCT/US2020/047749
§ 371 (c)(1),
(2) Date: Feb. 16, 2022

(87) PCT Pub. No.: WO2021/041382
PCT Pub. Date: Mar. 4, 2021

(65) Prior Publication Data
US 2022/0332531 A1 Oct. 20, 2022

Related U.S. Application Data

(60) Provisional application No. 62/891,491, filed on Aug. 26, 2019.

(51) Int. Cl.
*B65H 75/00* (2006.01)
*B65H 75/48* (2006.01)
*B60P 7/08* (2006.01)

(52) U.S. Cl.
CPC .......... *B65H 75/486* (2013.01); *B60P 7/0823* (2013.01)

(58) Field of Classification Search
CPC .............................. B65H 75/486; B60P 7/0823
See application file for complete search history.

(56) References Cited

U.S. PATENT DOCUMENTS 3,598,335 A 8/1971 Seeger
4,081,152 A 3/1978 Henderson
(Continued)

OTHER PUBLICATIONS

PCT International Search Report and Written Opinion completed by the ISA/US on Oct. 19, 2020 and issued in connection with PCT/US2020/047749.
(Continued)

*Primary Examiner* — Steven O Douglas
(74) *Attorney, Agent, or Firm* — Barnes & Thornburg LLP (57) ABSTRACT

A web retractor includes a frame having spaced-apart side walls, a spool rotatably mounted between the side walls, a web having one end mounted to the spool, the spool rotatable in a web take-up direction to wrap the web onto the spool and in a web pay out direction to unwrap the web from the spool, and a web take-up prevention apparatus movably mounted to the frame and responsive to actuation thereof to move relative to the frame to impart a resistance directly on the web sufficient to prevent the spool from rotating in the web take-up direction while also allowing the spool to rotate in the web pay out direction by pulling the web away from the retractor.

17 Claims, 8 Drawing Sheets

(56) References Cited

U.S. PATENT DOCUMENTS

| | | | |
|---|---|---|---|
| 6,547,218 B2 | 4/2003 | Landy | |
| 6,685,124 B2* | 2/2004 | Frank | B60R 22/46 |
| | | | 242/390.8 |
| 7,503,736 B1 | 3/2009 | Chen | |
| 2009/0047091 A1 | 2/2009 | Huck | |
| 2013/0104354 A1* | 5/2013 | Miller | B60P 7/083 |
| | | | 24/68 CD |
| 2020/0060238 A1* | 2/2020 | Soyuzov | B65H 75/4431 |
| 2023/0025300 A1* | 1/2023 | King | B60R 22/34 |
| 2023/0211750 A1* | 7/2023 | Bittner | B60R 22/3413 |
| | | | 242/381 |

OTHER PUBLICATIONS

International Preliminary Report on Patentability and Written Opinion of the International Searching Authority issued Mar. 1, 2022 for PCT/US20/47749.

* cited by examiner

WEB RETRACTOR INCLUDING WEB TAKE-UP PREVENTION APPARATUS

CROSS-REFERENCE TO RELATED APPLICATIONS

This patent application is a U.S. national stage entry of PCT Application No. PCT/US2020/047749, filed Aug. 25, 2020, which claims the benefit of and priority to U.S. Provisional Patent Application No. 62/891,491, filed Aug. 26, 2019, the disclosures of which are expressly incorporated herein by reference in their entireties.

TECHNICAL FIELD

The present disclosure relates generally to web retractors, and more specifically to web retractors selectively operable to prevent web take-up therein.

BACKGROUND

Web retractors may typically be implemented in motor vehicle and/or cargo restraint systems to selectively pay out and take-up restraint webs. It may be desirable under certain operating conditions of some such web retractors to selectively prevent web take-up, and in some cases while also allowing for web pay out.

SUMMARY

The present disclosure may comprise one or more of the features recited in the attached claims, and/or one or more of the following features and combinations thereof. In one aspect, a web retractor may comprise a frame including spaced-apart side walls, a spool rotatably mounted between the side walls, a web having one end mounted to the spool, the spool rotatable in a web take-up direction to wrap the web onto the spool and in a web pay out direction to unwrap the web from the spool, and a web take-up prevention apparatus movably mounted to the frame and responsive actuation thereof to move relative to the frame to impart a resistance directly on the web sufficient to prevent the spool from rotating in the web take-up direction while also allowing the spool to rotate in the web pay out direction by pulling the web away from the retractor.

In another aspect, a web retractor may comprise a frame including spaced-apart side walls and a bottom wall joining the side walls along a bottom end thereof, a spool rotatably mounted between the side walls, a web having one end mounted to the spool, the spool rotatable in a web take-up direction to wrap the web onto the spool and in a web pay out direction to unwrap the web from the spool, and a web take-up prevention apparatus movably mounted between the side walls and having a paddle lever defining a free end such that the web exiting and entering the spool passes between the free end of the paddle lever and a top surface of the bottom wall of the frame, the web take-up prevention apparatus responsive actuation thereof to move relative to the side walls to cause the free end of the paddle lever to press the web onto the top surface of the bottom wall of the frame so as to prevent the spool from rotating in the web take-up direction while also allowing the spool to rotate in the web pay out direction by pulling the web away from the retractor.

In yet another aspect, a web retractor may comprise a frame including spaced-apart side walls, a spool rotatably mounted between the side walls, a web having one end mounted to the spool, the spool rotatable in a web take-up direction to wrap the web onto the spool and in a web pay-out direction to unwrap the web from the spool, and a web take-up prevention apparatus movably mounted between the side walls and having at least one actuating finger and a paddle lever, the web take-up prevention apparatus responsive to application of force to the at least one actuating finger to move a free end of the paddle lever into the web to impart a resistance on the web sufficient to prevent the spool from rotating in the web take-up direction.

DESCRIPTION OF THE ILLUSTRATIVE EMBODIMENTS

For the purposes of promoting an understanding of the principles of this disclosure, reference will now be made to a number of illustrative embodiments shown in the attached drawings and specific language will be used to describe the same.

This disclosure relates to devices and techniques for imparting resistance or drag onto a web of a web retractor to prevent web take-up into the retractor under one or more selectable operating conditions while also allowing for web pay out. With reference to FIGS. 1A-5C, an example embodiment of such a web retractor 10 is shown which includes a web take-up prevention apparatus 60 that acts on the web 18 under at least one selectable operating condition to indirectly prevent the web spool 24 of the retractor 10 from rotating in the web take-up direction while also allowing the web spool 24 to rotate, under force applied to the web 18, in the web pay out direction as will be described in detail below. The web retractor 10 illustrated by example in FIGS. 1A-5C is provided in the form of a so-called ratcheting web retractor (sometimes referred to as a ratcheting tie down, retractable ratchet tie down device or strap, ratcheting cargo strap or the like). It will be understood, however, that the web take-up prevention apparatus 60 or similar such structure may be implemented in any conventional spooling web retractor provided that any such conventional spooling web retractor is modified to include one or more conventional structures for selectively causing the web take-up prevention apparatus or similar such structure to engage the web thereof to prevent web take-up as described below.

Figure 1A:
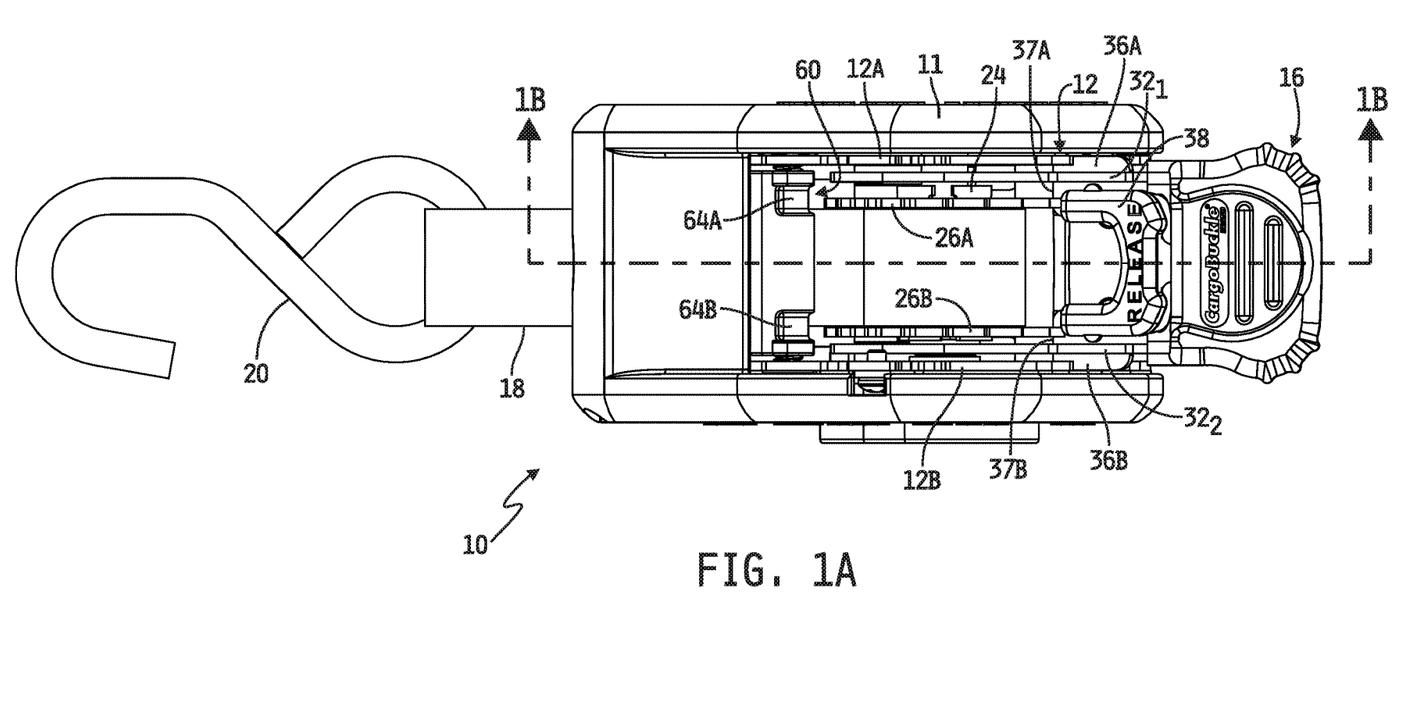
FIG. 1A is a top plan view of an embodiment of a web retractor including a web take-up prevention apparatus shown with a ratchet handle thereof in a locked position in which the web spool is prevented from rotating in a web pay out direction.
Figure 1B:
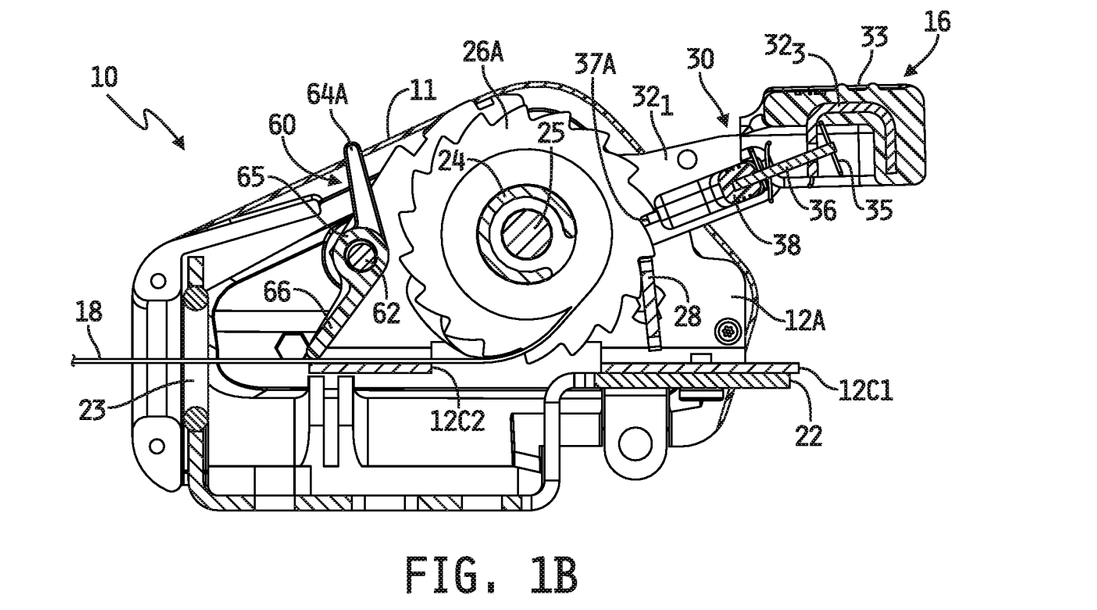
FIG. 1B is a cross-sectional view of the web retractor of FIG. 1A as viewed along section lines 1B-1B thereof.
Figure 1C:
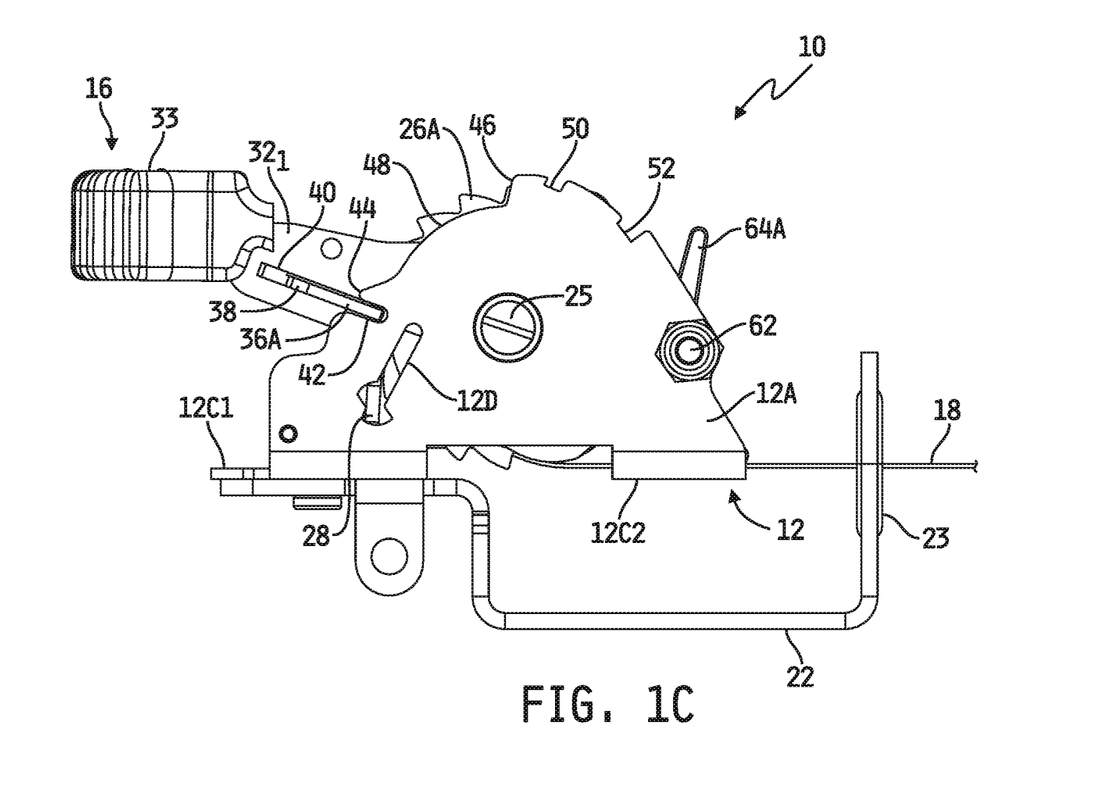
FIG. 1C is a side elevational view of the web retractor of FIGS. 1A and 1B shown with the cover removed to illustrate the locked position of the ratchet handle relative to a frame of the retractor.
Figure 1D:
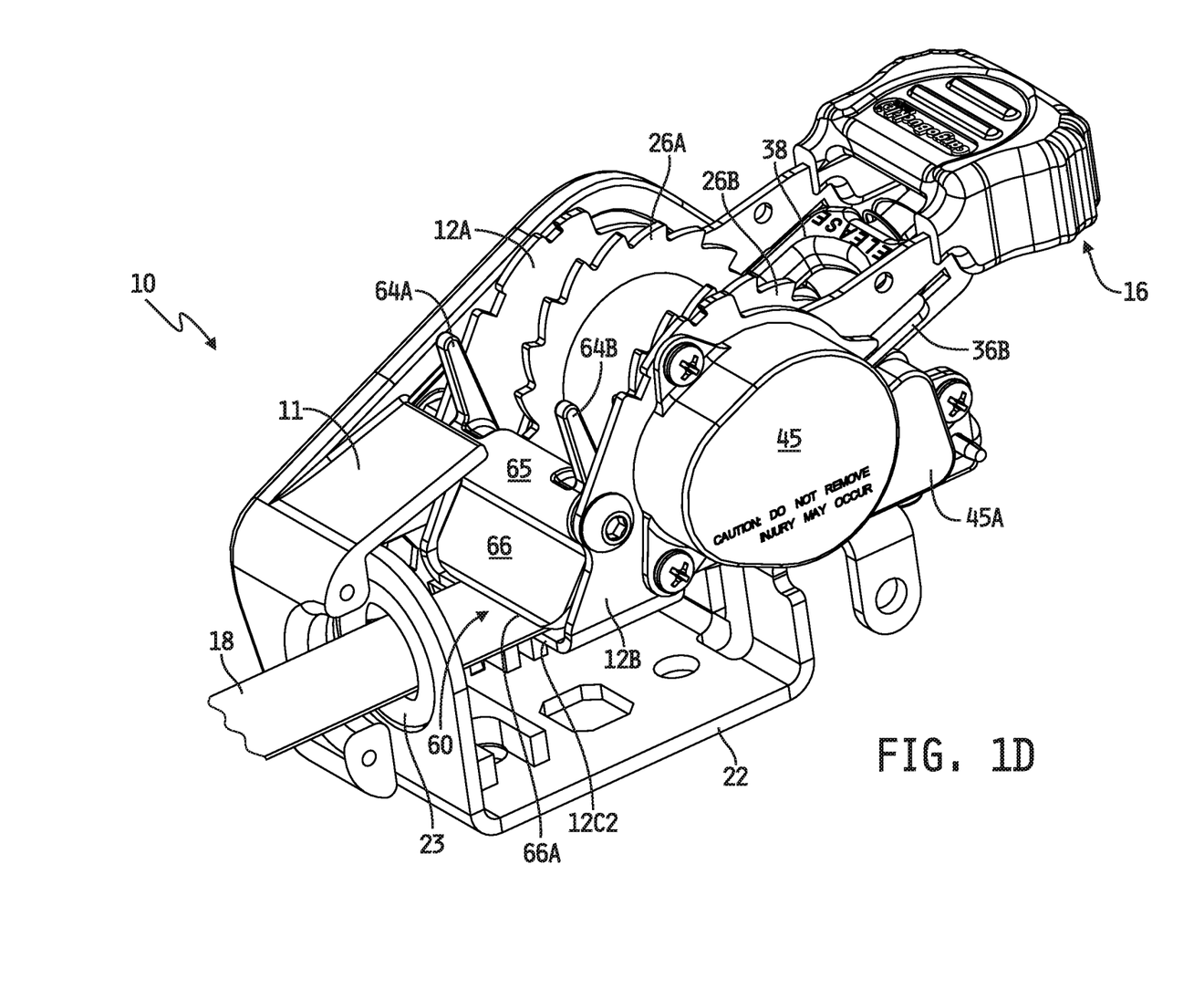
FIG. 1D is a perspective view of the web retractor of FIG. 1A shown with the cover in partial cutaway to illustrate an embodiment of the web take-up prevention apparatus.

Referring now to FIGS. 1A-1C, the example web retractor 10 is shown including a ratchet handle 16 depicted in a locked position in which the web spool 24 is prevented from rotating in a web pay out direction, i.e., in which the web 18 cannot be extracted, or "paid out," from the retractor 10. In the illustrated embodiment, the retractor 10 includes a cover 11 mounted to and over a frame 12, wherein the frame includes spaced-apart upstanding side walls 12A, 12B joined at their base by a bottom wall. In the illustrated embodiment, the bottom wall includes two bottom walls 12C1, 12C2 axially spaced apart from one another relative to the direction of travel of the web 18 into and out of the frame 12. In any case, the frame 12 illustratively defines an open U or C shape with the free ends of the spaced-apart side walls 12A, 12B each extending upwardly from the bottom walls 12C1, 12C2. A rotatable shaft 25 is rotatably mounted to and between the side walls 12A, 12B of the frame 12 such that the shaft 25 rotates between and relative to the side walls 12A, 12B in a conventional manner. The spool 24 is mounted over the shaft 25, e.g., the shaft 25 is received within the spool 24 and is coupled thereto, such that the spool 24 rotates with the shaft 25 relative to the side walls 12A, 12B of the frame 12. Toothed wheels or gears 26A, 26B are mounted to opposite respective ends of the spool 24 such that the toothed wheels 26A, 26B each rotate with the spool 24 relative to the side walls 12A, 12B of the frame 12. The side walls 12A, 12B each define an opening 12D therethrough via which a conventional lock pawl 28 is movably mounted to and between the side walls 12A, 12B. The lock pawl 28 is illustratively rotatable toward and away from the spool 28 between a locked position in which the lock pawl 28 is rotated toward the spool 24 and engages the toothed wheels 26A, 26B between adjacent pairs of teeth, as illustrated by example in FIGS. 1B, 2A and 3A, and an unlocked position in which the lock pawl 28 is rotated away from the spool 24 such that the lock pawl 28 does not engage the toothed wheels 26A, 26B as illustrated by example in FIGS. 4A and 5A. With the lock pawl 28 engaging the toothed wheels 26A, 26B, the lock pawl 28 prevents the spool 24 from rotating in the web pay out direction, i.e., so that the web 18 cannot be paid out of the retractor 10, but allows the spool 24 to rotate in the web take-up direction in response to counterclockwise movement (as seen in FIG. 1A) of the ratchet handle 16 as described more fully below. With the lock pawl 28 disengaged from the toothed wheels 26A, 26B, the lock pawl 28 does not prevent the spool 24 from rotating in either the web take-up or pay out directions. As shown by example in FIGS. 1B, 1C and 2A-5B, the lock pawl 28 is illustratively positioned between the side walls 12A, 12B above the bottom wall 12C1 of the frame 12.

The web 18 is illustratively a conventional flexible or semi-flexible web having one end coupled to the spool 24 and an opposite end coupled to an engagement member 20, wherein at least a portion of the web 18 is windable about the spool 24. In the illustrated embodiment, the engagement member 20 is provided in the form of a conventional hook member, although in alternate embodiments the engagement member 20 may be any conventional device, apparatus or assembly configured to engage or otherwise be secured to another structure. In the illustrated embodiment, the bottom wall 12C1 of the frame 12 is shown mounted to another frame 22 which is illustratively configured to mount to a motor vehicle, trailer or the like, or to mount to a rail or frame member coupled to a motor vehicle, trailer or the like. Also in the illustrated embodiment, a forward vertical wall of the frame 22 illustratively defines an opening therein through which the web 18 passes, and in some embodiments a ring 23 or other such structure may be positioned within the opening and configured, e.g., with rounded edges, to guide the web 18 through the frame 22 and/or to prevent catching or binding of the web 18 against the frame 22.

The spool 24 is conventionally rotatable in a web pay out direction in which the web 18 is paid out from the spool 24 and exits the retractor 10, and also in an opposite web take-up direction in which the web 18 is taken up into the retractor 10 and wound upon the spool 24. As shown by example in FIG. 1D, web retractor 10 illustratively includes a power spring assembly 45 mounted to the outer surface of the sidewall 12B of the retractor frame 12. The power spring assembly 45 is conventional and includes at least one conventional biasing member, e.g., a coiled spring, configured to engage the shaft 25 and/or the spool 24 and bias the spool 24 and the shaft 25 to rotate in the web take-up direction. To draw web 18 from the retractor 10 (without the spool 24 rotationally impeded by the lock pawl 28 or by the handle 16), sufficient force must be applied to the web 18 in the web pay out direction, i.e., out of and away from the retractor 10, to overcome the biasing force of the biasing member of the power spring assembly 45 coupled to the spool 24 and/or shaft 25 as is conventional. In the illustrated embodiment, the power spring assembly 45 is coupled to or integral with a lock pawl spring assembly 45A including at least one conventional biasing member configured to engage and bias the lock pawl 28 toward and into engagement with the toothed wheels 26A, 26B as described above. In alternate embodiments, the lock pawl spring assembly 45A may be separate from the power spring assembly 45. In any case, the teeth defined on the toothed wheels 26A, 26B are illustratively arcuate-shaped in a common direction, and are configured to allow the lock pawl 28, in its locked position, to engage the toothed wheels 26A, 26B between adjacent pairs of teeth to prevent rotation of the spool 24 in the web pay out direction but to allow the spool 24 to rotate in the web take-up position with the lock pawl 28 riding against the arcuate outer surfaces of the teeth, as illustrated by example in FIGS. 1B, 2A and 3A.

The ratchet handle 16 is illustratively formed of a handle frame 30 having spaced-apart side members $32_1$, $32_2$ joined at their top ends by a top frame member $32_3$. A handle grip 33, e.g., flexible, rigid or semi-rigid material, is fitted onto the top frame member $32_3$. The shaft 25 passes through the free ends of the side frame members $32_1$, $32_2$ on either side of the spool 24 such that the handle frame 30 rotates about, but is not driven by, the shaft 25 or spool 24. One end of a ratchet pawl 36 extends through an opening in the top frame member $32_3$, and opposite, spaced-apart ends 37A, 37B of the ratchet pawl 36 extend downwardly toward and into engagement with respective ones of the toothed wheels 26A, 26B. A biasing member 35, e.g., a coiled spring, biases the ratchet pawl 36 toward the toothed wheels 26A, 26B. Upper sides 36A, 36B of the ratchet pawl extend laterally away from the ratchet pawl 36 and through slots 40 formed through the handle frame side members $32_1$, $32_2$ and the ends 37A, 37B adjacent to the ratchet pawl sides 36A, 36B engage top portions of the side walls 12A, 12B of the frame 12 as illustrated be example in FIGS. 1A, 1C, 2B, 3B, 4B and 5B. A ratchet pawl grip 38, e.g., flexible, rigid or semi-rigid material, is fitted onto the ratchet pawl 36.

Figure 2A:
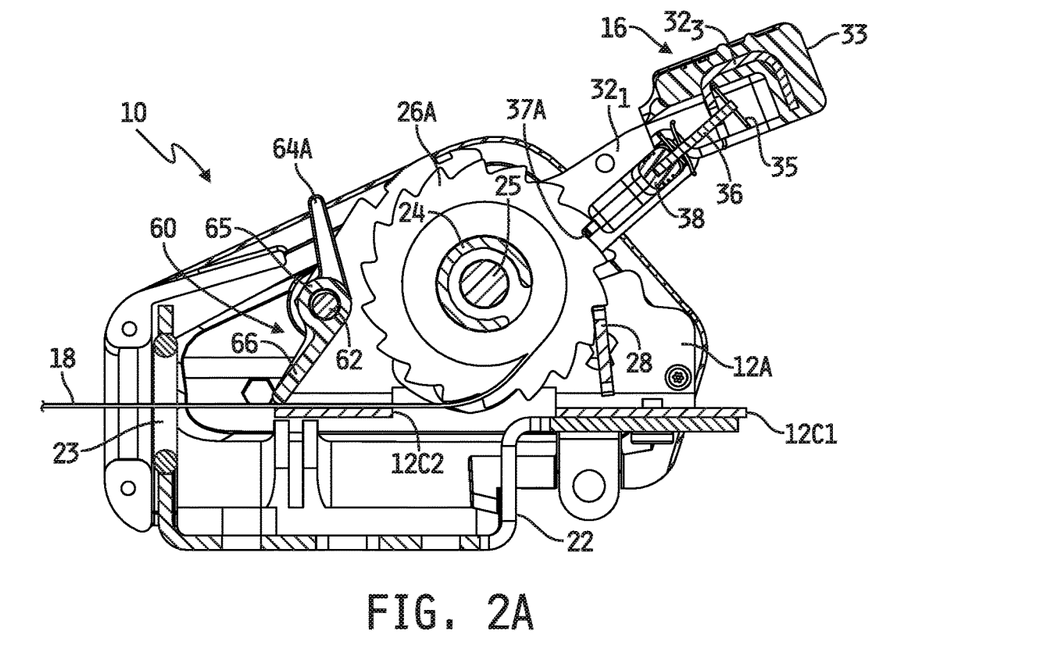
FIG. 2A is a cross-sectional view similar to FIG. 1B but showing the ratchet handle in a first extreme ratcheting position in which the ratchet handle may be moved relative to the frame to ratchet the web in the web take-up direction.
Figure 2B:
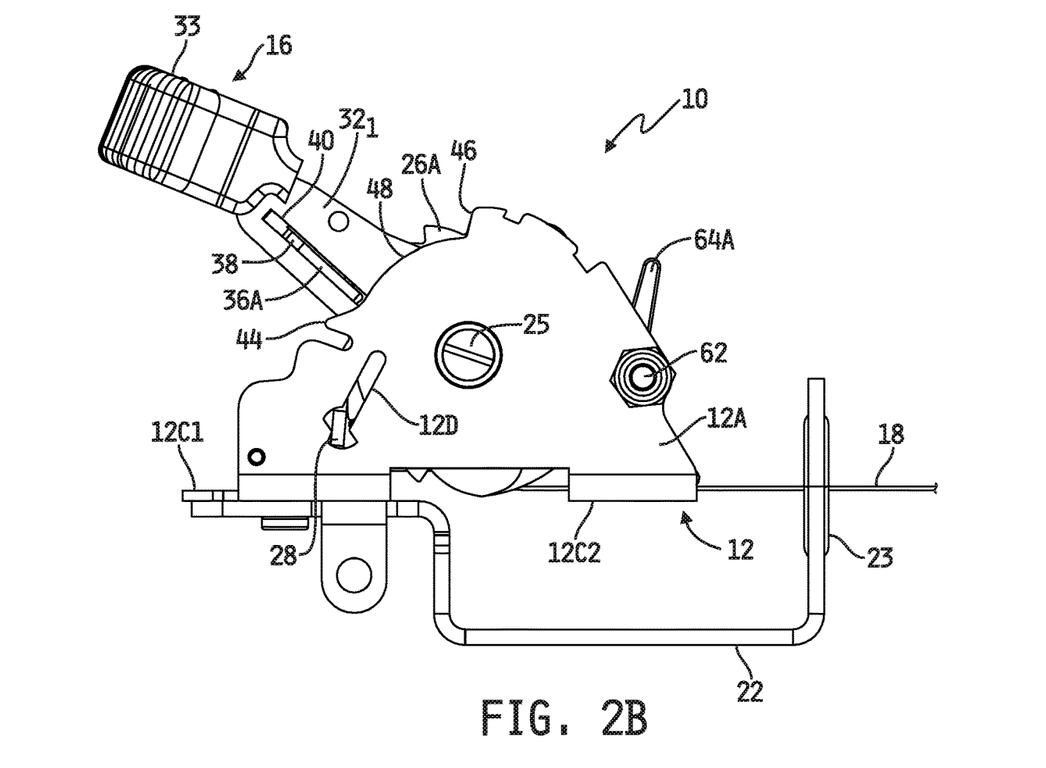
FIG. 2B is a side elevational view of the web retractor of FIG. 2A shown with the cover removed to illustrate the first extreme ratcheting position of the ratchet handle relative to the frame of the retractor.
Figure 3A:
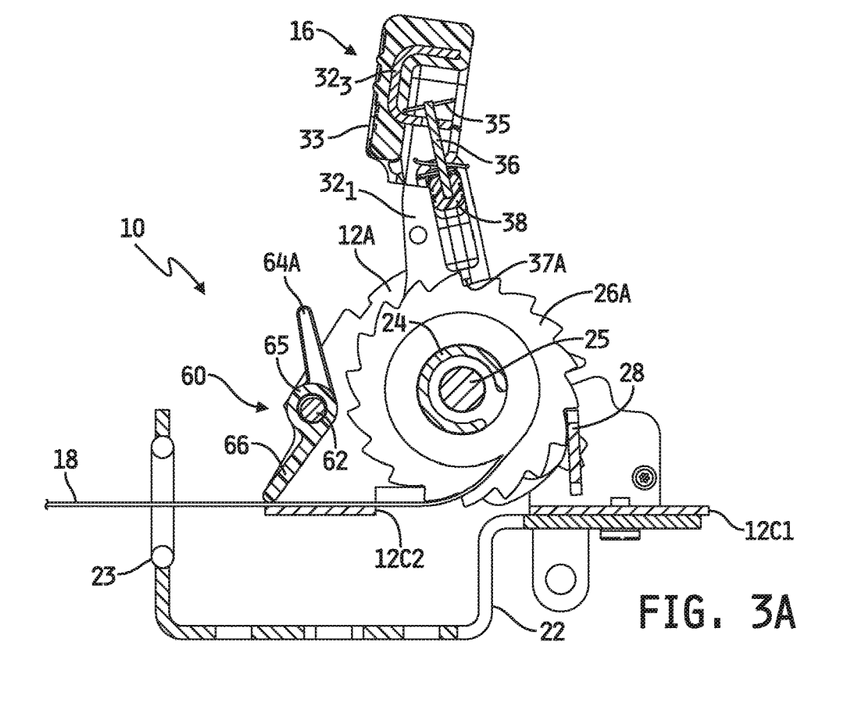
FIG. 3A is a cross-sectional view similar to FIGS. 1B and 2A but showing the ratchet handle in a second extreme ratcheting position in which the ratchet handle has been moved relative to the frame to ratchet the web in the web take-up direction.
Figure 4A:
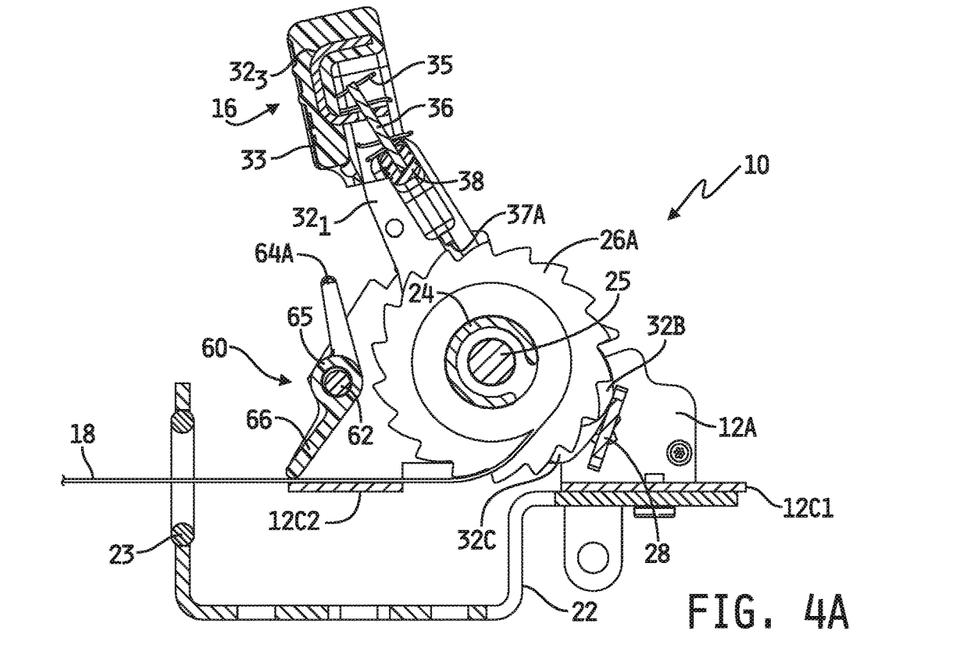
FIG. 4A is a cross-sectional view similar to FIGS. 1B, 2A and 3A but showing the ratchet handle in a free spooling position in which the web spool may be rotated in the web pay out or the web take-up direction.
Figure 5A:
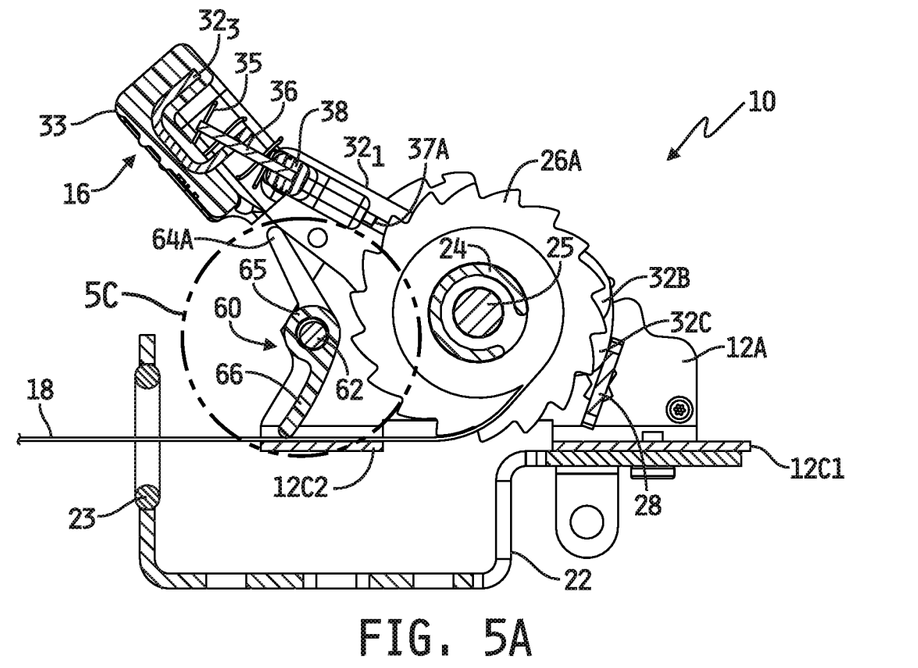
FIG. 5A is a cross-sectional view similar to FIGS. 1B, 2A, 3A and 4A but showing the ratchet handle in a web take-up prevention position in which the web spool may be rotated in the web pay out direction but in which a restriction apparatus acting on the web indirectly prevents the web spool from rotating in the web take-up direction.

The ratchet pawl 36 is illustratively movable, e.g., manually, relative to the top frame member $32_3$ between a locked position in which the free ends 37A, 37B of the ratchet pawl 36 engage the toothed wheels 26A, 26B between adjacent pairs of teeth, as illustrated by example in FIGS. 1B, 2A and 3A, and an unlocked position in which the ratchet pawl 36 is moved away from the spool 24 such that the free ends 37A, 37B of the ratchet pawl 36 do not engage the toothed wheels 26A, 26B as illustrated by example in FIGS. 4A and 5A. In some positions of the ratchet handle 16, the top surfaces of the side walls 12A, 12B act on the ends 37A, 37B of the ratchet pawl 36 allow the ratchet pawl 36 to move under bias of the biasing member 35 to its locked position to engage the toothed wheels 26A, 26B, and in other positions of the ratchet handle 16 the top surfaces of the side walls 12A, 12B act on the ends 37A, 37B of the ratchet pawl 36 to maintain the ratchet pawl 36 in its unlocked position by preventing the ratchet pawl 36 from moving under bias of the biasing member 35 to engage the toothed wheels 26A, 26B, as will be described in detail below. When the ratchet pawl 36 is in the locked position, the ends 37A, 37B of the ratchet pawl 36 engage the toothed wheels 26A, 26B between adjacent pairs of teeth such that upward and forward movement, e.g., rotation, of the handle 16 relative to the frame 12 (e.g., in the counterclockwise direction with respect to FIGS. 1A and 1B) causes the ratchet pawl 36 to rotate the spool 24 in the web take-up direction, whereas during rearward and downward movement, e.g., rotation, of the handle 16 relative to the frame 12 (e.g., in the clockwise direction with respect to FIGS. 1A and 1B) the ends 37A, 37B of the ratchet pawl 36 ride against and along the arcuate outer surfaces of the teeth of the toothed wheels 26A, 26B, as illustrated by example in FIGS. 2A and 3A. The handle 16 may thus be moved relative to the frame 12 as just described to incrementally ratchet the web 18 in the web take-up direction onto the spool 24 in a conventional manner.

The web retractor 10 further includes a web take-up prevention apparatus 60 in the form of a web movement restriction apparatus which acts directly on the web 18 under certain operating conditions or positions of the web retractor 10 to impart sufficient resistance or drag on the web 18 to prevent the spool 24 from rotating in the web take-up direction to take-up the web 18 thereon while also allowing the spool 24 to rotate in the web pay out direction by pulling the web 18 away from the retractor 10. Referring specifically to FIGS. 1A-1D, the web take-up prevention apparatus 60 includes an elongated body 65 sized to extend transversely between the side walls 12A, 12B of the frame 12. The body 65 defines a bore therethrough sized to receive an elongated spindle 62 that is illustratively affixed at each end to a respective one of the side walls 12A, 12B, such that the body 65 is rotatable about the spindle 62 relative to the frame 12. In alternate embodiments, the spindle 62 may be rotatable relative to the side walls 12A, 12B and the body 65 may be affixed to or rotatable relative to the spindle 62. As shown by example in FIGS. 1B, 1C and 2A-5B, the apparatus 60 is illustratively positioned above the bottom wall 12C2 of the frame 12, and the web 18 rides on and along a top surface 12E of the bottom wall 12C2 generally beneath the apparatus 60 (see, e.g., FIG. 5C) as the web 18 is paid out from the spool 24 and as the web 18 enters the retractor 10 to be taken up on the spool 24.

The apparatus 60 further illustratively includes actuating fingers 64A, 64B which extend upwardly away from the body 65 on either side thereof, wherein the fingers 64A, 64B are each aligned with the under-surface 32D of a respective one of the side members $32_1$, $32_2$ of the handle frame 30 so that, under certain operating conditions or positions of the web retractor 10, the under-surfaces 32D of the side members $32_1$, $32_2$ directly contact the respective actuating fingers 64A, 64B as the ratchet handle 16 is moved to actuate the web take-up prevention apparatus 60 (see, e.g. FIGS. 1A and 5A-5C). A paddle lever 66 extends downwardly from the body 65 toward the inner surface 12E of the bottom wall 12C2 of the frame 12 to a free end or tip 66A. In the illustrated embodiment, the paddle lever 66 is an elongated lever that spans, or nearly spans the width of the space defined laterally between the side walls 12A, 12B. In some alternate embodiments, the length of the paddle lever 66 may be less, perhaps considerably less, than the width of the space defined laterally between the side walls 12A, 12B. In the illustrated embodiment, the lateral width of the web 18 less than the length of the paddle lever 66 such that the paddle lever 66 extends beyond both sides of the web 18, although in alternate embodiments the lateral width of the web 18 may be equal to or greater than the length of the paddle lever 66. In the illustrated embodiment, the paddle lever 66 is a continuous body across its length, although in alternate embodiments the paddle lever 66 may be formed of two or more spaced-apart body segments. In one embodiment, the web take-up prevention apparatus 60 is of unitary construction, although in other embodiments the actuating fingers 64A, 64B, the paddle lever 66 and/or the body 65 may be separate components coupled together via suitable techniques.

In the illustrated embodiment, the body 65 of the web take-up prevention apparatus 60 is freely rotatable about or via the spindle 62, i.e., not rotationally constrained, relative to the side walls 12A, 12B. In this embodiment, the free end 66A of the paddle lever 66 may contact the web 18 in a normally unactuated position of the web take-up prevention apparatus 60 (i.e., in positions of the ratchet handle 16 in which the under-surfaces 32D of the side members $32_1$, $32_2$ are not acting on the actuating fingers 64A, 64B to force the free end 66A of the paddle lever into contact with the web 18), and may even ride along the web 18, but without impeding movement of the spool 24 in the web take-up or pay out directions. In the unactuated position of the apparatus 60, movement of the web 18 in either direction (i.e., web take-up or pay out) will typically kick the paddle lever 66 upwardly, causing the apparatus 60 to rotate about the spindle 62, so that any contact between the web 18 and the free end 66A of the paddle lever 66 during such movement of the web 18 will be incidental. In alternate embodiments, the apparatus 60 may be rotationally biased, e.g., via one or more biasing members on and between the apparatus 60 and one or both of the side walls 12A, 12B of the frame 12, to the normally unactuated position in which the free end 66A of the paddle lever 66 is spaced apart from the exposed surface of the web 18 and therefore does not contact the web 18. In such embodiments, the bias of such one or more biasing members will be such that the rotational bias imparted thereby on the apparatus 60 will be easily overcome by movement of the ratchet handle 16 to move the apparatus to the actuated position which is described more fully below. In any case, movement of the ratchet handle 16 relative to the frame 12 to a web take-up restricting position causes the under-surfaces 32D of the side members 32$_1$, 32$_2$ of the handle frame 30 to contact and act on the actuating fingers 64A, 64B in a direction which causes the body 65 to rotate about the spindle 62 in the same direction (counter-clockwise in FIG. 1B) which forces the free end 66A of the paddle lever 66 onto the exposed surface of the web 18 to press the web 18 against the top surface 12E of the bottom wall 12C2 so as to prevent the spool 24 from rotating in the web take-up direction.

In the illustrated embodiment, the paddle lever 66 forms an acute angle relative to an imaginary vertical line that extends downwardly from and bisects the spindle 62 in the rotational position of the apparatus 60 in which the free end 66A of the paddle lever 66 just contacts the web 18 (see, e.g., FIG. 1B) such that the free end 66A of the paddle lever 66 extends forwardly away from the imaginary vertical line with the imaginary vertical line positioned between the paddle lever 66 and the spool 24. In some embodiments, at least part of the apparatus 60 is formed of a flexible or semi-rigid yet resilient material, such as rubber, plastic or similar material, such that the paddle lever 66 and/or actuating fingers 64A, 64B and/or portion(s) thereof, deform(s) as the paddle lever 66 contacts and presses the web 18 against the top surface 12E of the bottom wall 12C2 of the frame 12. In alternate embodiments, the apparatus 60 may be formed of a rigid plastic or other material such that neither the paddle 66 nor the actuating fingers 64A, 64B deform, although in some such embodiments either or both of the paddle lever 66 and/or the actuating fingers 64A, 64B may somewhat flex, bow or bend relative to the body 65 as the apparatus 60 is moved to the actuated positon thereof as described herein. In any case, the apparatus 60 of this embodiment is actuated, as described above, via rotation of the ratchet handle 16 into contact with the actuating fingers 64A, 64B which causes the body 65 to rotate about the spindle 62 and, which, in turn, rotates the free end 66A of the paddle lever 66 into contact with the web 18 and presses or pinches the web 18 against the top surface 12E of the bottom wall 12C2 so as to impart sufficient resistance or drag on the web 18 to prevent the spool 24 from rotating in the web take-up direction under bias of the power spring assembly 45 to take-up the web 18 thereon. Movement of the web 18 in the opposite direction, i.e., in the web pay out direction of the spool 24, may be accomplished by pulling the web 18 away from the retractor 10 with a force greater than the combination of the resistance or drag imparted on the web 18 by the paddle lever 66 and the biasing force of the power spring assembly 45 acting on the spool 24.

In some embodiments, regardless of the material composition of the paddle lever 66, the free end (or ends) 66A of the paddle lever 66 and/or the top surface 12E of the bottom wall 12C2 of the frame 12 may include or define one or more protruding, embossed and/or other structures, e.g., in the form of one or more teeth, serrations, knurls or the like. In embodiments which include them, such structure(s) is/are illustratively configured to impart or enhance the resistance or drag force applied by the paddle lever 66 to and on the web 18 in the take-up direction of the web 18 while also allowing the spool 24 to rotate, under force applied to the web 18 in the web pay out direction that is greater than the combination of the biasing force applied to the shaft 25 and/or spool 24 by the power spring apparatus 45 and the resistance or drag applied by the paddle lever 66 to the web 18.

In some alternate embodiments, the web take-up prevention apparatus 60 may be configured to be responsive application of a force, applied via the under-surfaces 32D of the side members 32$_1$, 32$_2$ of the handle frame 30 to the actuating fingers 64A, 64B in response to movement of the ratchet handle 16 as described above, to cause the free end or tip 66A of the paddle lever 66 to engage, i.e., contact, the web 18 and, on its own (i.e., without relying on pinching of the web 18 between the free end or tip 66A of the paddle lever 66 and the top surface 12E of the bottom wall 12C2 of the frame 12), impart sufficient resistance or drag on the web 18 so as to prevent the spool 24 from rotating in the web take-up direction. In such embodiments, the web take-up prevention apparatus 60 may be rotationally biased, e.g., as described above, to a normally unactuated position in which the free end 66A of the paddle lever 66 is spaced apart from the exposed surface of the web 18 so as not to impede movement of the web 18. Movement of the ratchet handle 16 relative to the frame 12 to the web take-up restricting position causes the side members 32$_1$, 32$_2$ of the handle frame 30 to act on, and impart a downward force upon, the actuating fingers 64A, 64B which causes the body 65 to rotate about the spindle 62 in a direction which forces the free end 66A of the paddle lever 66 into contact with the exposed surface of the web 18. In this embodiment, the free end or tip 66A of the paddle lever 66 illustratively includes or defines one or more protruding, embossed and/or other structures, e.g., in the form of one or more teeth, serrations, knurls or the like, configured to contact and engage (e.g., grip or grab) the web 18 to impart the resistance or drag force to the web 18 in the take-up direction of the web 18 while also allowing the spool 24 to rotate, under force applied to the web 18 in the web pay out direction that is greater than the combination of the biasing force applied to the shaft 25 and/or spool 24 by the power spring apparatus 45 and the resistance or drag applied by the free end or tip 66A of the paddle lever 66 to the web 18. As one non-limiting example, such one or more protruding, embossed or other structures may illustratively be configured to "bite into" or otherwise engage the web 18 moving in the web take-up direction, but to provide a relatively smooth surface to the web 18 moving in the web pay out direction.

Those skilled in the art will recognize other structures and/or material compositions of the apparatus 60 and/or of the paddle lever 66 for applying the resistance or drag force to the web 18 in a manner which prevents movement of the web 18 in the web take-up direction (i.e., which prevents rotation of the spool 24 and shaft 25 in the web take-up direction) but which allows movement of the web 18 in the web pay out direction (i.e., which allows rotation of the spool 24 and shaft 25 in the web pay out direction), and it will be understood that any such other structures and/or material compositions are contemplated by this disclosure.

The top surfaces of the side walls 12A, 12B of the frame 12 each define a number of different features; some of which, depending on the position of the ratchet handle 16 relative to the frame 12, allow the ratchet pawl 36 to advance, under bias of the biasing member 35, to its locked position described above, and others of which, also depending upon the position of the ratchet handle 16 relative to the frame 12, limit the ratchet pawl 36 to its unlocked position. Referring specifically to FIG. 1C, for example, the top surfaces of the side walls 12A, 12B (only 12B shown) each define a notch or channel 42 at one end thereof. With the sides 36A, 36B of the ratchet pawl 36 disposed in the respective channels 42, as illustrated in FIG. 1C, the ratchet pawl 36 is in its locked position with the free ends 37A, 37B abutting the toothed wheels 26A, 26B as illustrated in FIG. 1B. In order to position the sides 36A, 36B of the ratchet pawl 36 within the channels 42 as illustrated in FIG. 10, the ratchet pawl grip 38 is manually drawn toward the top frame member $32_3$, i.e., against the bias of the biasing member 35, so that the top end of the ratchet pawl 36 is drawn into the opening defined through the top frame member $32_3$, and the ratchet handle 16 is then moved, e.g., rotated, relative to the top surfaces of the side walls 12A, 12B toward the channels 42. It will be noted that sufficient force must be applied to the ratchet pawl grip 38 to draw the sides 36A, 36B of the ratchet pawl 36 over the protrusion 44 extending from the top surfaces of the side walls 12A, 12B so that the sides 36A, 36B of the ratchet pawl 36 may then be positioned, via manual manipulation of the ratchet handle 16, over the channels 42. With the sides 36A, 36B positioned over and aligned with the channels 42, the ratchet pawl grip 38 is then released and the sides 36A, 36B of the ratchet pawl 36 pass, under bias of the biasing member 35, into the channels 42, as illustrated in FIG. 1C, and the free ends 37A, 37B of the ratchet pawl 36 abut the toothed wheels 26A, 26B between adjacent teeth thereof. This position of the ratchet handle 16 relative to the frame 12 is referred to as the "locked" position of the ratchet handle 16, as both the lock pawl 28 and the ratchet pawl 28 abut the toothed wheels 26A, 26B, thereby preventing rotation of the spool 24 in the web pay out direction. Typically, although not exclusively, the ratchet handle 16 may be placed in the "locked" position illustrated in FIGS. 1A-1C after the engagement member 20 has been coupled to another structure and the web 18 has subsequently been drawn taut by ratcheting the ratchet handle 16, as illustrated by example in FIGS. 2A-3B and described below, to incrementally draw the web 18 onto the spool 24 in the web take-up direction.

Referring now specifically to FIGS. 1C and 2A-3B, the top surfaces of the side walls 12A, 12B (only 12B shown) further each define a web ratcheting region 48 between the protrusion 44 at one end thereof and a stop wall 46 at an opposite end thereof. With the sides 36A, 36B of the ratchet pawl 36 disposed in the web ratcheting region 48, the ratchet pawl 36 is in its locked position with the free ends 37A, 37B abutting the toothed wheels 26A, 26B as illustrated in FIGS. 2A and 3A. In order to position the sides 36A, 36B of the ratchet pawl 36 in the web ratcheting region 48 from the channels 42 illustrated in FIG. 1C, the ratchet pawl grip 38 is manually drawn toward the top frame member $32_3$, i.e., against the bias of the biasing member 35, so that the top end of the ratchet pawl 36 is drawn into the opening defined through the top frame member $32_3$, and the ratchet handle 16 is then moved, e.g., rotated, relative to the top surfaces of the side walls 12A, 12B toward the region 48. It will be noted that sufficient force must be applied to the ratchet pawl grip 38 to draw the sides 36A, 36B of the ratchet pawl 36 over the protrusion 44 extending from the top surfaces of the side walls 12A, 12B so that the sides 36A, 36B of the ratchet pawl 36 may then be positioned, via manual manipulation of the ratchet handle 16, over the region 48. With the sides 36A, 36B moved past the protrusion 44 and positioned over the web ratcheting region 48 adjacent thereto, the ratchet pawl grip 38 is then released and the sides 36A, 36B of the ratchet pawl 36 pass, under bias of the biasing member 35, onto the web ratcheting region 48, as illustrated in FIG. 2A, and the free ends 37A, 37B of the ratchet pawl 36 abut the toothed wheels 26A, 26B between adjacent teeth thereof.

Figure 3B:
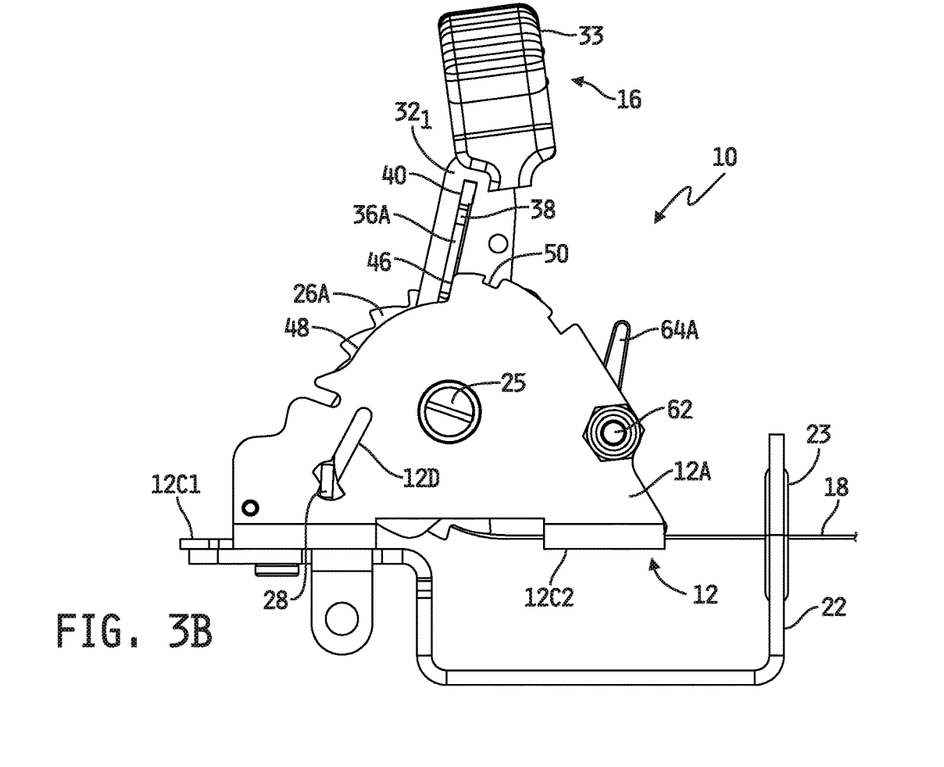
FIG. 3B is a side elevational view of the web retractor of FIG. 3A shown with the cover removed to illustrate the second extreme ratcheting position of the ratchet handle relative to the frame of the retractor.

The position of the ratchet handle 16 relative to the frame 12 with the free ends 37A, 37B of the ratchet pawl 36 riding on the web ratcheting region 48 of the frame 12 is referred to as the ratcheting position of the ratchet handle 16, as both the lock pawl 28 and the ratchet pawl 28 abut the toothed wheels 26A, 26B, thereby preventing rotation of the spool 24 in the web pay out direction. From this position, the ratchet handle 16 may be moved along the ratcheting region 48 toward, and to, the stop 46, and in doing so the free ends 37A, 37B of the ratchet pawl 36 engage the flat edges of respective teeth on the toothed wheels 26A, 26B and rotate the spool 24 in the web take-up direction as the ratchet handle 16 moves toward the stop 46 and the lock pawl 28 rides against the arcuate outer surfaces of the teeth, as illustrated in FIGS. 3A and 3B. As the ratchet handle 16 is then moved along the web ratcheting region 48 back toward the protrusion 44, the free ends 37A, 37B of the ratchet pawl 36 ride against the arcuate outer surfaces of the teeth on the toothed wheels 26A, 26B and the lock pawl engages the flat surfaces of respective teeth on the toothed wheels 26A, 26B to prevent rotation of the spool in the web pay out direction as the ratchet handle moves back toward the protrusion 44. This process may illustratively be repeated one or more times to incrementally ratchet more of the web 18 onto the spool 24 all the while preventing rotation of the spool 24 in the web pay out direction. As briefly described above, this ratcheting process may thus be repeated one or more times, after the engagement member 20 has been coupled to another structure, to draw the web 18 taut.

Figure 4B:
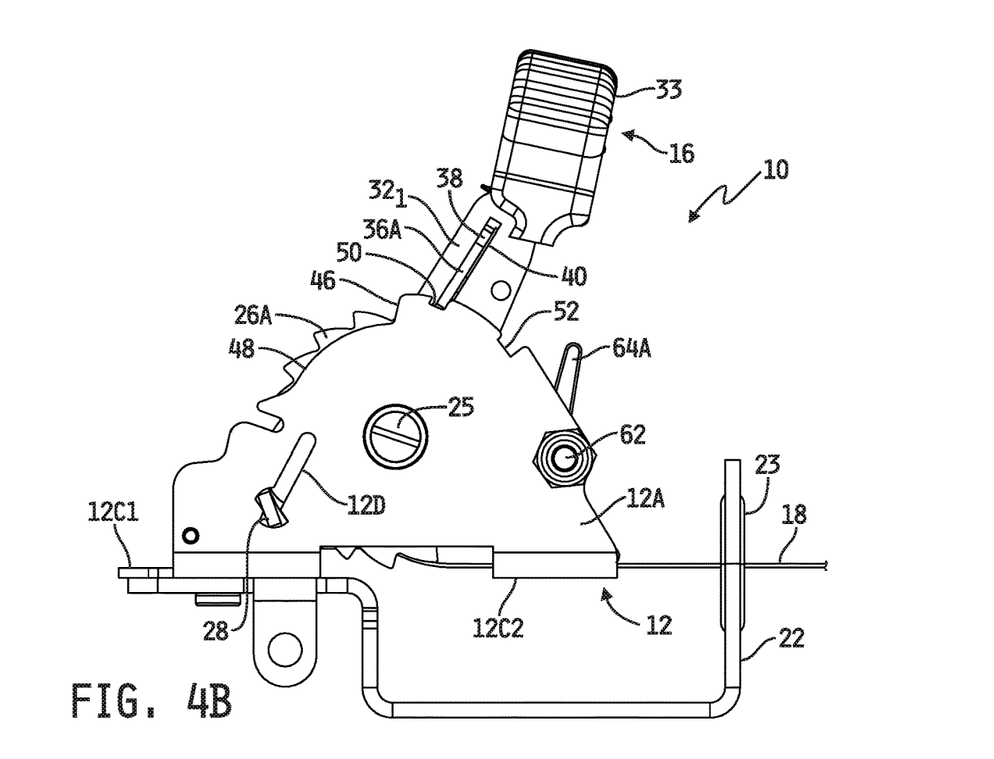
FIG. 4B is a side elevational view of the web retractor of FIG. 4A shown with the cover removed to illustrate the free spooling position of the ratchet handle relative to the frame of the retractor.

Referring now specifically to FIGS. 1C and 4A-4B, the top surfaces of the side walls 12A, 12B (only 12B shown) further each define another notch or channel 50 beyond the stop wall 46 such that the stop wall 46 is defined on the top surfaces of each side wall 12A, 12B is positioned between the ratcheting region 48 and the channel 50. With the sides 36A, 36B of the ratchet pawl 36 disposed in the channel 50, the ratchet pawl 36 is in its unlocked position with the free ends 37A, 37B spaced apart from, and therefore not contacting, the toothed wheels 26A, 26B as illustrated in FIGS. 4A and 4B. In order to position the sides 36A, 36B of the ratchet pawl 36 in the channel 50 from the web ratcheting region 48 illustrated in FIG. 3B, the ratchet pawl grip 38 is manually drawn toward the top frame member $32_3$, i.e., against the bias of the biasing member 35, so that the top end of the ratchet pawl 36 is drawn into the opening defined through the top frame member $32_3$, and the ratchet handle 16 is then moved, e.g., rotated, relative to the top surfaces of the side walls 12A, 12B toward the channel 50. It will be noted that sufficient force must be applied to the ratchet pawl grip 38 to draw the sides 36A, 36B of the ratchet pawl 36 over the stop wall 46 so that the sides 36A, 36B of the ratchet pawl 36 may then be positioned, via manual manipulation of the ratchet handle 16, over the channel 50. With the sides 36A, 36B moved past the stop 46 and positioned over and aligned with the channel 50, the ratchet pawl grip 38 is then released and the sides 36A, 36B of the ratchet pawl 36 pass, under bias of the biasing member 35, into the channel 50, as illustrated in FIG. 4B, and the free ends 37A, 37B of the ratchet pawl 36 are spaced apart from, and therefore not contacting, the toothed wheels 26A, 26B as illustrated in FIG. 3A. In the process of moving the ratchet handle 16 to reposition the sides 36A, 36B of the ratchet pawl 36 from the ratcheting region 48 adjacent the stop 46 to the channel 50 as just described, lobes 32B defined at the lower ends of the side members $32_1$, $32_2$ of the handle frame 30 come into contact with the lock pawl 28 and force the lock pawl 28 away from, and out of contact with, the toothed wheels 26A, 26B, as illustrated by example in FIG. 4A. This position of the ratchet handle 16 relative to the frame 12 is referred to as the "free-spooling" position of the ratchet handle 16, as neither the lock pawl 28 nor the ratchet pawl 28 is in contact with the toothed wheels 26A, 26B, and the spool 24 may thus be freely rotated in either direction, e.g., in the web take-up direction under bias of the spool biasing member or in the web pay out direction by moving the web 18 in the web pay out direction with a force greater than that of the spool biasing member. Typically, although not exclusively, the ratchet handle 16 may be placed in the "free-spooling" position illustrated in FIGS. 4A-4B during the process of engaging the engagement member 20 with another structure.

Figure 5B:
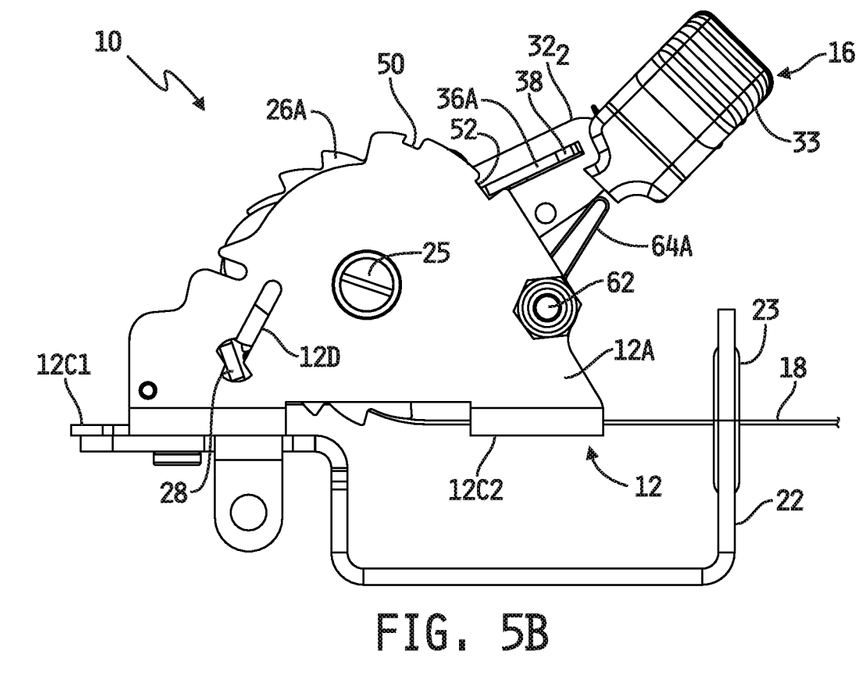
FIG. 5B is a side elevational view of the web retractor of FIG. 5A shown with the cover removed to illustrate the web take-up prevention position of the ratchet handle relative to the frame of the retractor.
Figure 5C:
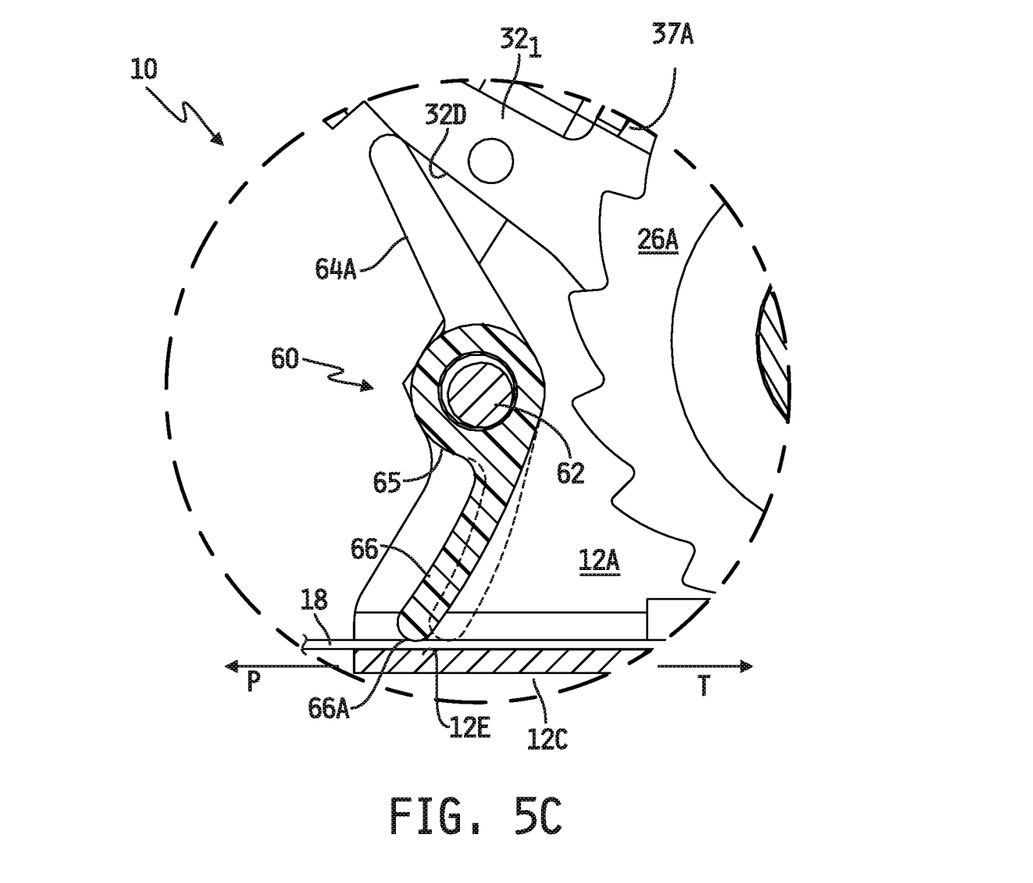
FIG. 5C is a magnified view of the area 5C of FIG. 5A illustrating operation of the web restriction apparatus.

Referring now specifically to FIGS. 1C and 5A-5B, the top surfaces of the side walls 12A, 12B (only 12B shown) further each define yet another notch or channel 52 beyond the channel 50 such that the channel 50 defined on the top surfaces of each side wall 12A, 12B is positioned between the stop wall 46 and the channel 52. With the sides 36A, 36B of the ratchet pawl 36 disposed in the channel 52, the ratchet pawl 36 is in its unlocked position with the free ends 37A, 37B spaced apart from, and therefore not contacting, the toothed wheels 26A, 26B as illustrated in FIGS. 5A and 5C. In order to position the sides 36A, 36B of the ratchet pawl 36 in the channel 52 from the channel 50 illustrated in FIG. 4B, the ratchet pawl grip 38 is manually drawn toward the top frame member $32_3$, i.e., against the bias of the biasing member 35, so that the top end of the ratchet pawl 36 is drawn into the opening defined through the top frame member $32_3$, and the ratchet handle 16 is then moved, e.g., rotated, relative to the top surfaces of the side walls 12A, 12B toward the channel 52. It will be noted that sufficient force must be applied to the ratchet pawl grip 38 to draw the sides 36A, 36B of the ratchet pawl 36 out of the channel 50 so that the sides 36A, 36B of the ratchet pawl 36 may then be positioned, via manual manipulation of the ratchet handle 16, over the channel 52. With the sides 36A, 36B moved past the channel 50 and positioned over and aligned with the channel 52, the ratchet pawl grip 38 is then released and the sides 36A, 36B of the ratchet pawl 36 pass, under bias of the biasing member 35, into the channel 52, as illustrated in FIG. 5B, and the free ends 37A, 37B of the ratchet pawl 36 are spaced apart from, and therefore not contacting, the toothed wheels 26A, 26B as illustrated in FIGS. 5A and 5C. In the process of moving the ratchet handle 16 to reposition the sides 36A, 36B of the ratchet pawl 36 from the channel 50 into the channel 52 as just described, additional lobes 32C defined at the lower ends of the side members $32_1$, $32_2$ of the handle frame 30 adjacent to the lobes 32B come into contact with the lock pawl 28 and continue to force the lock pawl 28 away from, and out of contact with, the toothed wheels 26A, 26B, as illustrated by example in FIG. 5A.

Also in the process of moving the ratchet handle 16 to reposition the sides 36A, 36B of the ratchet pawl 36 from the channel 50 into the channel 52 as just described, the under-surface 32D of each of the side members $32_1$, $32_2$ of the handle frame 30 come into contact with a respective one of the actuating fingers 64A, 64B of the web take-up prevention apparatus 60. As the ratchet handle is moved to align the sides 36A, 36B of the ratchet pawl 36 with the channel 52, the under-surface 32D of each of the side members $32_1$, $32_2$ of the handle frame 30 apply a downward force on the actuating fingers 64A, 64B and rotate the body 65 about the spindle 62 (in the counterclockwise direction with reference to FIGS. 1D, 5A and 5C). As the body 65 is rotated (e.g., counterclockwise) about the spindle 62, the free end or tip 66A of the paddle lever 66 is initially forced into contact with the exposed surface of the web 18, and further rotation of the body 65 about the spindle 62 causes the free end or tip 66A of the paddle lever 66 to force the web 18 against the top surface 12E of the bottom wall 12C2 of the frame 12 so as to "pinch" the web 18 between the free end or tip 66A of the paddle lever 66 and the top surface 12E of the bottom wall 12C2 of the frame 12 of the retractor 10. The web take-up prevention apparatus 60 is thus rotated by movement of the ratchet handle 16 from the unactuated position of the web take-up prevention apparatus 60 illustrated in FIGS. 1A-4B to the actuated position of the web take-up prevention apparatus 60 illustrated in FIGS. 5A-5C in which the sides 36A, 36B of the ratchet pawl 36 are received within the channel 52 of the side walls 12A, 12B of the frame 12 and the free end 66A of the paddle lever 66 pinches the web 18 against the top surface 12E of the bottom wall 12C2 of the frame 12.

This position of the ratchet handle 16 relative to the frame 12 is referred to as the "web take-up prevention" position of the ratchet handle 16 in which neither the lock pawl 28 nor the ratchet pawl 28 is in contact with the toothed wheels 26A, 26B, but in which the free end 66A of the paddle lever 66 of the web take-up prevention apparatus 60 is forced into contact with the web 18 so as to press or pinch the web 18 against the top surface 12E of the bottom wall 12C2 of the frame 12. In this actuated position of the web take-up prevention apparatus 60, the paddle lever 66 illustratively imparts sufficient resistance or drag on the web 18 to indirectly prevent the spool 24 from rotating in the web take-up direction. Illustratively, the paddle lever 66 forms an acute rearward angle relative to vertical in the actuated position of the web take-up prevention apparatus 60, as illustrated by example in FIGS. 5A and 5C, such that the free end or tip 66A faces away from the spool 24. In this position, pulling the web 18 away from the retractor 10 allows for forced pay out of the web 18 from the spool 24 if the pulling force applied to the web 18 is greater than the combination of the biasing force of the power spring assembly 45 acting on the spool 24 and/or spindle 25 and the drag force applied by the free end or tip 66A of the paddle 66 against the web 18 and the top surface 12E of the bottom wall 12C2 of the frame 12. Attempted movement of the web 18 in the web take-up direction T, under bias of the power spring assembly 45, only forces the free end 66A of the paddle lever 66 deeper into the web 18, as illustrated by dashed-line example in FIG. 5C, thereby preventing rotation of the spool 24 and spindle 25 in the web take-up direction. In the web take-up prevention position of the ratchet handle 16, the spool 24 may thus be rotated in the web pay out direction by moving the web 18 in the web pay out direction with a force greater than that of the spool biasing member together with any resistance force imparted on the web by the paddle lever 66, but the force of the paddle lever 66 acting against the web 18 and the top surface 12E of the bottom wall 12C2 of the frame 12 to pinch or grip the web 18 between the paddle lever 66 and the top surface 12E of the bottom wall 12C2 of the frame 12 indirectly prevents rotation of the spool 24 in the web take-up direction. Typically, although not exclusively, the ratchet handle 16 may be placed in the "web take-up prevention" position illustrated in FIGS. 5A-5C when paying out the web 18 to engage the engagement member 20 with another structure, wherein inadvertent or intentional releasing the web 18 during such a process will not result in take-up of the web 18 onto the spool 24.

While this disclosure has been illustrated and described in detail in the foregoing drawings and description, the same is to be considered as illustrative and not restrictive in character, it being understood that only illustrative embodiments thereof have been shown and described and that all changes and modifications that come within the spirit of this disclosure are desired to be protected. For example, whereas the web take-up prevention apparatus 60 is illustrated and described as being actuated by under-surfaces 32D of the side members $32_1$, $32_2$ of the handle frame 30 of the ratchet handle 16, this disclosure contemplates other structures for actuating the web take-up prevention apparatus 60. Some specific examples include, but are not limited to, one or more other structures of the handle frame 30 or of the ratchet handle 16, one or more structures mounted to the frame 12 and actuated by movement of one or more components of the ratchet handle 16 and/or one or more structures mounted to the frame 12 and configured to be moved manually and/or automatically in response to operation of the retractor 10. As another example, whereas the web take-up prevention apparatus 60 is illustrated and described as being rotatably mounted to and between the frame sidewalls 12A, 12B, this disclosure contemplates non-rotatable mounting of the apparatus 60 to one or both sidewalls 12A, 12B and/or to one or more other portions of the frame 12 or other structure mounted to the frame 12. In any case, the web take-up prevention apparatus 60 will be movably mounted to the frame 12 between unactuated and actuated positions thereof.

What is claimed is:

1. A web retractor, comprising:
   a frame including spaced-apart side walls and a bottom wall extending between the spaced-apart side walls,
   a spool rotatably mounted between the side walls,
   a web having one end mounted to the spool, the spool rotatable in a web take-up direction to wrap the web onto the spool and in a web pay out direction to unwrap the web from the spool, and
   a web take-up prevention apparatus movably mounted to the frame and responsive to actuation thereof to move relative to the frame to impart a resistance directly on the web sufficient to prevent the spool from rotating in the web take-up direction while also allowing the spool to rotate in the web pay out direction by pulling the web away from the retractor, the web take-up prevention apparatus including a body portion movably mounted to the at least one of the side walls, and a paddle lever coupled to or integral with the body portion, the paddle lever having a free end extending away from the body portion toward the web,
   wherein the web is positioned between a top surface of the bottom wall and paddle lever and the free end of the paddle lever contacts the web upon actuation of the web take-up prevention apparatus to impart the resistance directly on the web,
   wherein, with the spool rotating in the web take-up direction, the web rides on and along the top surface of the bottom wall as the web advances toward the spool, and with the spool rotating in the web pay out direction, the web rides on and along the top surface of the bottom wall as the web advances away from the spool,
   and wherein the body portion moves relative to the side walls upon actuation of the web take-up prevention apparatus to press the free end of the paddle lever into the web and thereby press the web into the top surface of the bottom wall to impart the resistance on the web.

2. The web retractor of claim 1, wherein, in an unactuated state of the web take-up prevention apparatus, the free end of the paddle lever rides along the web without impeding movement of the spool in the web take-up direction or is spaced apart from the web.

3. The web retractor of claim 1, further comprising a power spring assembly mounted to one of the side walls and operatively coupled to the spool, the power spring assembly applying a biasing force to the spool to cause the spool to rotate in the web take-up direction,
   wherein, in the actuated state of the web take-up prevention apparatus, the resistance imparted on the web resulting from the free end of the paddle lever pressing the web into the top surface of the bottom wall is greater than the biasing force applied to the spool by the power spring assembly so as to prevent the spool from rotating in the web take-up direction,
   and wherein, in the actuated state of the web take-up prevention apparatus, the spool is rotatable in the web payout direction to pay out the web from the web retractor by pulling the web away from the spool with a force sufficient to overcome a combination of the imparted resistance and the biasing force applied to the spool in the web take-up direction.

4. The web retractor of claim 1, wherein the web take-up prevention apparatus further includes at least one actuating finger coupled to or integral with the body portion, the web take-up prevention apparatus responsive application of a force to the at least one actuating finger to move relative to the frame to impart the resistance directly on the web.

5. The web retractor of claim 1, wherein the body portion of the web take-up prevention apparatus is rotatably mounted to and between the side walls such that the web take-up prevention apparatus is rotatable between and relative to the side walls of the frame.

6. The web retractor of claim 1, further comprising means for actuating the web take-up prevention apparatus.

7. A web retractor, comprising:
   a frame including spaced-apart side walls and a bottom wall joining the side walls along a bottom end thereof,
   a spool rotatably mounted between the side walls,
   a web having one end mounted to the spool, the spool rotatable in a web take-up direction to wrap the web onto the spool and in a web pay out direction to unwrap the web from the spool, and
   a web take-up prevention apparatus movably mounted between the side walls and having a paddle lever defining a free end such that the web exiting and entering the spool passes between the free end of the paddle lever and a top surface of the bottom wall of the frame, the web take-up prevention apparatus responsive actuation thereof to move relative to the side walls to cause the free end of the paddle lever to press the web onto the top surface of the bottom wall of the frame so as to prevent the spool from rotating in the web take-up direction while also allowing the spool to rotate in the web pay out direction by pulling the web away from the retractor.

8. The web retractor of claim 7, further comprising a power spring assembly mounted to one of the side walls and operatively coupled to the spool, the power spring assembly applying a biasing force to the spool to cause the spool to rotate in the web take-up direction.

9. The web retractor of claim 8, wherein the free end of the paddle lever is configured to press, upon actuation of the web take-up prevention apparatus, the web onto the top surface of the bottom wall of the frame with a first force greater than the biasing force applied to the spool by the power spring assembly to prevent the spool from rotating in the web take-up direction.

10. The web retractor of claim 9, wherein, following actuation of the web take-up prevention apparatus, the spool is rotatable in the web pay out direction by pulling the web away from the retractor with a second force greater than a combination of the first force and the biasing force applied to the spool by the power spring assembly.

11. The web retractor of claim 7, wherein the web retractor is a ratcheting web retractor including a ratcheting handle movably mounted to the side walls of the frame and operatively coupled to the spool, the ratcheting handle movable relative to the side walls to actuate the web take-up prevention apparatus.

12. The web retractor of claim 11, wherein the web take-up prevention apparatus further includes at least one actuating finger coupled to the paddle lever such that the at least one actuating finger and the paddle lever move together, the ratcheting handle actuating the web take-up prevention apparatus by contacting and moving the at least one actuating finger to cause the free end of the paddle lever to press the web onto the top surface of the bottom wall of the frame.

13. A web retractor, comprising:
a frame including spaced-apart side walls and a bottom wall joining respective ends of the side walls,
a spool rotatably mounted between the side walls,
a web having one end mounted to the spool, the spool rotatable in a web take-up direction to wrap the web onto the spool and in a web pay-out direction to unwrap the web from the spool, and
a web take-up prevention apparatus movably mounted between the side walls and having at least one actuating finger and a paddle lever, the web take-up prevention apparatus responsive to application of force to the at least one actuating finger to move a free end of the paddle lever into the web to impart a resistance on the web sufficient to prevent the spool from rotating in the web take-up direction, wherein, with the spool rotating in the web take-up direction, the web rides on a top surface of the bottom wall as the web advances toward the spool, and with the spool rotating in the web pay out direction, the web rides on the top surface of the bottom wall as the web advances away from the spool, and wherein, upon the application of force to the at least one actuating finger, the free end of the paddle lever presses the web into the top surface of the bottom wall to impart the resistance on the web.

14. The web retractor of claim 13, wherein, with the free end of the paddle lever moved into the web to impart the resistance on the web, the spool remains rotatable in the web pay out direction by pulling the web away from the retractor with a force greater than the resistance imparted on the web by the free end of the paddle lever.

15. The web retractor of claim 13, wherein, in an unactuated state of the web take-up prevention apparatus, the free end of the paddle lever rides along the web without impeding movement of the spool in the web take-up direction or is spaced apart from the web.

16. The web retractor of claim 13, further comprising a power spring assembly mounted to one of the side walls and operatively coupled to the spool, the power spring assembly applying a biasing force to the spool to cause the spool to rotate in the web take-up direction, wherein, in the actuated state of the web take-up prevention apparatus, the resistance imparted on the web resulting from the free end of the paddle lever pressing the web into the top surface of the bottom wall is greater than the biasing force applied to the spool by the power spring assembly so as to prevent the spool from rotating in the web take-up direction, and wherein, in the actuated state of the web take-up prevention apparatus, the spool is rotatable in the web payout direction to pay out the web from the web retractor by pulling the web away from the spool with a first force sufficient to overcome a combination of the imparted resistance and the biasing force applied to the spool in the web take-up direction.

17. The retractor of claim 13, further comprising means for selectively applying the force to the at least one actuating finger.

* * * * *